(12) United States Patent
Bergstrom et al.

(10) Patent No.: US 8,813,342 B2
(45) Date of Patent: Aug. 26, 2014

(54) CLAD ALLOY SUBSTRATES AND METHOD FOR MAKING SAME

(71) Applicant: ATI Properties, Inc., Albany, OR (US)

(72) Inventors: David S. Bergstrom, Allison Park, PA (US); Kris J. Schott, Leechburg, PA (US); Mark A. Tarhay, Freeport, PA (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 13/757,924

(22) Filed: Feb. 4, 2013

(65) Prior Publication Data

US 2013/0139373 A1 Jun. 6, 2013

Related U.S. Application Data

(63) Continuation of application No. 10/865,060, filed on Jun. 10, 2004, now Pat. No. 8,387,228.

(51) Int. Cl.
| | |
|---|---|
| *B23P 11/00* | (2006.01) |
| *B32B 15/00* | (2006.01) |
| *B32B 15/01* | (2006.01) |
| *B32B 15/18* | (2006.01) |
| *C22F 1/10* | (2006.01) |
| *B23K 20/227* | (2006.01) |
| *B23K 33/00* | (2006.01) |
| *B23K 20/04* | (2006.01) |

(52) U.S. Cl.
CPC .............. *B23P 11/00* (2013.01); *B23K 20/227* (2013.01); *B23K 33/00* (2013.01); *B23K 20/04* (2013.01); *B23K 2203/16* (2013.01); *Y10S 29/904* (2013.01)
USPC ............. 29/514; 428/615; 428/681; 428/680; 29/505; 29/890.039; 29/904; 148/516; 148/527; 148/529

(58) Field of Classification Search
USPC ................ 29/505, 514, 527.6, 530, 890.039, 29/890.054, 904; 428/615, 679, 680, 681; 148/516, 527, 529; 228/262.3, 262.41
See application file for complete search history.

(56) References Cited

U.S. PATENT DOCUMENTS

| 1,564,581 A | 12/1925 | King |
| 2,145,248 A | 1/1939 | Chace |

(Continued)

FOREIGN PATENT DOCUMENTS

| DE | 2431081 B1 | 8/1975 |
| EP | 0535817 A2 | 4/1993 |

(Continued)

OTHER PUBLICATIONS

Technical Data Blue Sheet, Allegheny Ludlum AL200™ Alloy, AL201™ Alloy (Allegheny Ludlum, 1998).

(Continued)

*Primary Examiner* — Essama Omgba
(74) *Attorney, Agent, or Firm* — K & L Gates LLP; John E. Grosselin, III

(57) ABSTRACT

A method for producing a single-clad or multiple-clad product includes providing a welded assembly comprising a cladding material disposed on a substrate material. Both the substrate material and the cladding material are individually selected alloys. At least a first edge of the cladding material of the welded assembly does not extend to a first edge of the substrate material and thereby provides a margin between the first edges. A material that is an alloy having hot strength greater than the cladding material is within the margin and adjacent the first edge of the cladding material. The welded assembly is hot rolled to provide a hot rolled band, and the material within the margin inhibits the cladding material from spreading beyond the edge of the substrate material during the hot rolling. In certain embodiments of the methods, the substrate material is stainless steel and the cladding material is nickel or a nickel alloy.

26 Claims, 9 Drawing Sheets

(56) References Cited

U.S. PATENT DOCUMENTS

| | | | | |
|---|---|---|---|---|
| 2,255,301 | A | 9/1941 | Thompson | |
| 2,386,091 | A | 10/1945 | Carlson | |
| 2,395,877 | A | 3/1946 | Keene | |
| 2,438,759 | A * | 3/1948 | Liebowitz | 228/175 |
| 2,473,686 | A * | 6/1949 | Keene | 428/589 |
| 2,537,207 | A | 1/1951 | Carlson et al. | |
| 2,718,690 | A | 9/1955 | Ulam | |
| 2,828,406 | A | 3/1958 | Kinkead | |
| 2,904,880 | A | 9/1959 | McGlynn | |
| 2,932,866 | A | 4/1960 | Althouse | |
| 2,932,886 | A * | 4/1960 | Althouse | 228/175 |
| 3,175,893 | A | 3/1965 | Meretsky | |
| 3,233,312 | A | 2/1966 | Cowan et al. | |
| 3,397,444 | A | 8/1968 | Bergmann et al. | |
| 3,482,303 | A | 12/1969 | Trost | |
| 3,490,126 | A | 1/1970 | Miller | |
| 3,493,353 | A | 2/1970 | Bergmann et al. | |
| 3,505,139 | A | 4/1970 | Wentworth | |
| 3,684,464 | A | 8/1972 | Happ et al. | |
| 3,718,443 | A | 2/1973 | Faulkner et al. | |
| 3,909,049 | A | 9/1975 | Blatnica | |
| 3,912,152 | A * | 10/1975 | Forand, Jr. | 228/190 |
| 4,103,076 | A | 7/1978 | Ulam | |
| 4,162,758 | A | 7/1979 | Mikarai | |
| 4,178,417 | A | 12/1979 | Oda et al. | |
| 4,246,045 | A | 1/1981 | Ulam | |
| 4,257,549 | A | 3/1981 | Briemont | |
| 4,525,223 | A | 6/1985 | Tsuya et al. | |
| 4,593,776 | A | 6/1986 | Salesky et al. | |
| 4,620,660 | A | 11/1986 | Turner | |
| 4,694,985 | A * | 9/1987 | Ouchi et al. | 228/235.3 |
| 4,737,418 | A | 4/1988 | Slattery | |
| 4,831,708 | A | 5/1989 | Yoshiwara et al. | |
| 4,839,242 | A | 6/1989 | Murayama et al. | |
| 4,861,682 | A * | 8/1989 | Hashimoto et al. | 428/685 |
| 4,917,969 | A | 4/1990 | Pircher et al. | |
| 4,936,504 | A | 6/1990 | Arai et al. | |
| 5,000,368 | A | 3/1991 | Turner | |
| 5,055,362 | A | 10/1991 | McCormick et al. | |
| 5,060,845 | A * | 10/1991 | Suenaga et al. | 228/186 |
| 5,183,198 | A | 2/1993 | Tamehiro et al. | |
| 5,190,831 | A | 3/1993 | Banker | |
| 5,246,160 | A | 9/1993 | Jonas | |
| 5,316,863 | A | 5/1994 | Johnson et al. | |
| 5,356,755 | A | 10/1994 | Matsuda et al. | |
| 5,376,464 | A | 12/1994 | Dupoiron et al. | |
| 5,383,592 | A | 1/1995 | Fussnegger et al. | |
| 5,476,725 | A | 12/1995 | Papich et al. | |
| 5,531,371 | A | 7/1996 | Matsuzawa | |
| 5,669,436 | A | 9/1997 | Papich et al. | |
| 5,855,699 | A | 1/1999 | Oyama et al. | |
| 5,972,131 | A | 10/1999 | Asada et al. | |
| 6,022,426 | A | 2/2000 | Mennucci et al. | |
| 6,096,145 | A | 8/2000 | Pandey et al. | |
| 6,109,504 | A | 8/2000 | Groll | |
| 6,113,998 | A | 9/2000 | Aizawa et al. | |
| 6,150,037 | A | 11/2000 | Saijo et al. | |
| 6,245,166 | B1 | 6/2001 | Shibuya et al. | |
| 6,251,527 | B1 | 6/2001 | Schelin et al. | |
| 6,312,834 | B1 | 11/2001 | Ishio et al. | |
| 6,316,128 | B1 | 11/2001 | Ishio | |
| 6,403,235 | B1 | 6/2002 | Glidden et al. | |
| 6,413,651 | B1 | 7/2002 | Yan et al. | |
| 6,475,675 | B1 | 11/2002 | Pandey et al. | |
| 6,692,841 | B2 | 2/2004 | Shindo et al. | |
| 6,783,870 | B2 | 8/2004 | Haynes et al. | |
| 7,160,632 | B2 * | 1/2007 | Nakamura et al. | 428/673 |
| 7,876,017 | B2 * | 1/2011 | Nakamura et al. | 310/233 |
| 8,387,228 | B2 * | 3/2013 | Bergstrom et al. | 29/514 |
| 2003/0094209 | A1 | 5/2003 | Imasaki et al. | |
| 2005/0273994 | A1 | 12/2005 | Bergstrom et al. | |
| 2013/0065080 | A1 * | 3/2013 | Takada et al. | 428/654 |

FOREIGN PATENT DOCUMENTS

| | | | | |
|---|---|---|---|---|
| GB | 0847103 | | 9/1960 | |
| GB | 1218957 | | 1/1971 | |
| JP | 61-269988 | A | 11/1986 | |
| JP | 02121783 | A * | 5/1990 | B23K 20/04 |
| JP | 3-250577 | A | 11/1991 | |
| JP | 3-285781 | A | 12/1991 | |
| JP | 05177363 | A * | 7/1993 | B23K 20/00 |
| JP | 8-174239 | A | 7/1996 | |
| JP | 9-279248 | A | 10/1997 | |
| JP | 10-29076 | A | 2/1998 | |
| JP | 11-77374 | A | 3/1999 | |
| JP | 2000-153372 | | 6/2000 | |
| JP | 2002-501832 | A | 1/2002 | |
| JP | 2003-27140 | A | 1/2003 | |
| RU | 2061083 | C1 | 5/1996 | |
| RU | 2103130 | C1 | 1/1998 | |

OTHER PUBLICATIONS

Technical Data Blue Sheet, Chromium-Nickel Stainless Steel Types 302, 304L and 305 (Allegheny Ludlum, 1998).

Technical Data Blue Sheet, Chromium-Nickel-Molybdenum Stainless Steel Types 316, 316L, 317 and 317L (Allegheny Ludlum, 1999).

"Metal Cladding", accessed from www.corrosion-doctors.org/MetalCoatings/Cladding.htm on Jan. 19, 2005.

High Performance [sic] Clad Metal Manufacturing, Organization: Ametek Metals, access from www.ametakmetals.com/cladmanufacture.asp on Jan. 19, 2005.

Abstract of article "Roll Clad Composites", Blech Rohre Profile 39, 10, Oct. 1992, pp. 763-767.

Abstract of article "Clad Sheet Welding, Techniques and Suggestions", Fonderia 48, 5-6, May-Jun. 1999, pp. 108-115.

* cited by examiner

CLAD ALLOY SUBSTRATES AND METHOD FOR MAKING SAME

CROSS REFERENCE TO RELATED APPLICATION

This application is a continuation application claiming priority under 35U.S.C. §120 to U.S. patent application Ser. No. 10/865,060, now U.S. Pat. No. 8,387,228, entitled, "CLAD ALLOY SUBSTRATES AND METHOD FOR MAKING SAME", filed Jun. 10, 2004, and which is hereby incorporated by reference herein in its entirety.

BACKGROUND OF THE TECHNOLOGY

1. Field of Technology

The present disclosure relates to clad alloy substrates and to methods of making such clad materials. The present disclosure also relates to articles of manufacture made from or including clad alloy substrates and to methods of making such articles of manufacture.

2. Description of the Background of the Technology

In certain applications requiring a material combining high strength with corrosion resistance, clad alloys are used. One common example of a clad alloy exhibiting favorable strength and corrosion resistance includes a stainless steel layer clad on its opposed surfaces with a layer of nickel or a nickel-base alloy (i.e., an alloy that is predominantly composed of nickel). Applications in which such clad materials are used include chemical cisterns, chimney flues, batteries, tubing, heat exchangers, piping for oil and gas, tanks for chemicals, and cookware. The stainless steel layer provides relatively high strength, while the nickel or nickel-base cladding layers resist corrosion under demanding conditions. Using a nickel dual-clad stainless steel of this type also has the advantage that the composite material is less expensive than certain high alloy content superaustenitic stainless steels and nickel-base alloys providing similar corrosion resistance properties.

The cladding process involves cladding a substrate material with either a single cladding layer or with a cladding layer on each of the substrate's opposed surfaces. The process used to produce a clad alloy must bond the one (single-clad) or two (dual-clad) cladding layers to the substrate sufficiently to prevent delamination of the cladding layers while under service conditions. Several cladding methods are known.

One known method for producing a clad stainless steel is described in U.S. Pat. No. 4,936,504. More specifically, the '504 patent describes methods for cladding stainless steel with various materials including copper, nickel and invar (an iron-36% nickel alloy). In general, the '504 patent describes a method wherein sheets of the stainless steel substrate and the cladding materials are stacked together and then rolled into a tight coil. The coil is heated in a vacuum furnace at high temperature for an extended period, thereby diffusion bonding the sheets of cladding materials to the stainless steel sheets. Significant energy is required to operate the vacuum furnace equipment and maintain the coil at elevated temperature for an extended period when conducting the '504 patent's method, and this adds substantially to the cost of the finished clad material.

U.S. Pat. No. 5,183,198, describes a method for producing a clad steel plate wherein a stainless steel or nickel alloy is clad onto an iron-base substrate comprising 0.020 to 0.06% carbon, 0.5% or less silicon, 1.0 to 1.8% manganese, 0.03% or less phosphorus, 0.005% or less sulfur, 0.08 to 0.15% niobium, 0.005 to 0.03% titanium, 0.05% or less aluminum and 0.002 to 0.006% nitrogen. (All percentages herein are weight percentages unless otherwise indicated). Slabs of the cladding material and the substrate material are rolled to plates of prescribed thickness. After smoothing, cleaning and degreasing all contact surfaces of the plates, an assembly slab is prepared by sandwiching a plate of the iron-base substrate material between two plates of the cladding material. The periphery of the assembled plates is then seal-welded and a vacuum pump used to remove air between the plate's contact surfaces. The assembly slab is then heated in the range of 1100° to 1250° F. and subjected to one or more rolling and cooling steps to adhere the materials and form the clad product. As such, in contrast to the method of the '504 patent, which utilizes a vacuum furnace, the '198 patent teaches creating a vacuum only in the space between the opposed surfaces of the cladding material and the substrate material.

In yet another known method for producing clad materials, known as explosion cladding, the controlled energy of a detonating explosive is used to create a metallurgical bond between two or more similar or dissimilar materials. Explosion cladding is a cold pressure process in which contaminant surface films on the materials to be bonded are plastically jetted off the base metals as a result of a high-pressure collision of the two metals. During the high velocity collision of metal plates, a jet is formed between the plates, and contaminant surface films that are detrimental to establishing a metallurgical bond are swept away in the jet. The metal plates, cleaned of surface films by the jet action, are joined at an internal point under influence of the very high pressure that is obtained near the collision point. Early patent issued in this area include U.S. Pat. Nos. 3,233,312, 3,397,444 and 3,493,353.

Each of the above known cladding methods requires the use of vacuum apparatus or other sophisticated equipment. In addition, the cladding method of the '504 patent, for example, is limited to the production of relatively thin gauge coil product and requires separately hot and cold rolling the substrate and cladding materials to sheet form before the cladding operation. With respect to explosive cladding, the process is typically expensive and labor-intensive, requires the use of dangerous explosive materials, and may result in a non-uniform, wavy interface between the substrate and cladding layers, which may be unsuitable for certain applications.

Accordingly, it would be advantageous to provide an alternative method for cladding stainless steels and other materials with alloy cladding materials. Such alternative method preferably does not require use of a vacuum furnace, explosive cladding equipment, or other sophisticated production equipment.

SUMMARY

One aspect of the present disclosure is directed to a novel method for producing a clad product from a substrate material and a cladding material, wherein both the substrate material and the cladding material are alloys. The method includes assembling the substrate and cladding materials and welding them together to provide what is referred to herein as a "welded assembly", and then hot rolling the welded assembly to provide a hot rolled band. The welded assembly may be provided by disposing the cladding material on the substrate material so that at least a first edge of the cladding material does not extend to a first edge of the substrate material, thereby providing a margin between the adjacent first edges. An alloy having hot strength greater than the cladding material is disposed within the margin and adjacent the first edge of the cladding material. The material disposed in the margin inhibits the cladding material from spreading beyond the substrate material during the hot rolling operation.

In certain embodiments of the foregoing method of the present disclosure, the cladding material and the substrate material are present in the welded assembly in the form of individual plates, and the margin is defined by the space between a first edge of the plate of the cladding material and an adjacent first edge of the plate of the substrate material. In certain of such embodiments, the material having greater hot strength than the cladding material is the substrate material itself and, in such a case the plate of the cladding material is disposed in a recess formed in a surface of the plate of the substrate material so that a projecting portion of the substrate material defines at least one wall of the recess and is within the margin and adjacent at least the first edge of the plate of the cladding material. The recess may be formed in a surface of the plate of the substrate material using any conventional technique such as, for example, casting the plate to include the recess or by removing material from the plate surface, such as by machining.

In certain other embodiments of the method of the present disclosure, at least one framing element composed of an alloy having hot strength less than the cladding material is positioned on the plate of the substrate material adjacent the first edge of the plate of the cladding material in the margin between such first edge and the first edge of the plate of the substrate material.

It is believed that the method of the present disclosure may be used with a wide range of combinations of substrate materials and cladding materials. As non-limiting examples, the substrate material may be stainless steel (such as T-316L stainless steel) or carbon steel.

In general, useful cladding materials must not be molten at the hot working temperatures, and preferably also have a capacity for hot working similar to the substrate material in the hot rolling temperature range. Non-limiting examples of possible cladding materials include nickel (which may include residual impurities), nickel-base alloys, stainless steels, and copper and copper alloys. The possible nickel cladding materials include the commercially pure wrought nickels classified under UNS Designation N02200 and UNS Designation N02201, which are available from Allegheny Ludlum, Pittsburgh Pa., as AL 200™ alloy and AL 201™ alloy, respectively. These nickels differ only in terms of the maximum carbon level allowed by the specifications, 0.15 weight percent carbon for AL 200™ alloy, and 0.02 weight percent carbon for AL 201™ alloy. In addition, each of the two nickels has the following typical composition, in weight percentages: 0.02 copper, 0.05 iron, 0.02 manganese, 0.05 silicon, 0.002 sulfur and balance nickel+cobalt.

Certain embodiments of the method of the present disclosure may further include the steps of annealing the hot rolled band formed on hot rolling the welded assembly, and cold rolling the hot rolled band to provide a clad strip having a desired gauge. In certain embodiments, cold rolling the hot rolled band may include two or more distinct steps of cold rolling, and the cold rolled strip also may be intermediate annealed between successive cold rolling steps so as to relieve stresses within the material. The one or more annealing steps may be, for example, conventional annealing or bright annealing. Other steps may be performed as are known in the metallurgical arts to provide the clad strip in a desired form and with desired characteristics.

In those embodiments of the method of the present disclosure wherein the material in the margin is not a projecting portion of the substrate material, the framing material provided in the margin can be composed of any alloy having hot strength greater than the cladding material and which is suitable for the processing steps applied to the welded assembly. For example, when applying an embodiment of the method of the present invention to a substrate composed of a T-316L stainless steel and a nickel cladding material, the framing material may be T-304L stainless steel. In certain embodiments of the method of the present disclosure, the welds of the welded assembly are such that a substantially airtight space is provided between the cladding material and the substrate material in the welded assembly. In such case the method may include, prior to the step of hot rolling the welded assembly, the step of evacuating air from the airtight space between the cladding material and the substrate material.

The method of the present disclosure is useful for providing single-clad or multiple-clad substrate materials. One non-limiting application of the method will be for the production of dual-clad products, wherein the cladding layers may be the same or different materials. The clad product can be designed to exhibit advantageous properties contributed by the substrate material and the one or more cladding materials. For example, a nickel dual-clad stainless steel strip may exhibit the superior strength properties contributed by the stainless steel core material and the superior corrosion resistance properties contributed by the nickel cladding layers.

An additional aspect of the present disclosure is directed to a novel method for producing a clad stainless steel, wherein the method comprises hot rolling a welded assembly to provide a hot rolled band. The welded assembly is provided by disposing a plate of an alloy cladding material on a stainless steel plate, wherein at least a first edge of the plate of the cladding material does not extend to a first edge of the stainless steel plate and thereby provides a margin on the stainless steel plate. At least one framing element is provided in the margin, adjacent the first edge of the plate of the cladding material, and the plate of cladding material and the stainless steel plate are welded to the framing element. The framing element is an alloy having hot strength greater than the cladding material. During hot rolling, the framing element inhibits the cladding material from spreading beyond the stainless steel. The method optionally further comprises annealing the hot rolled band, and cold rolling the hot rolled band, in one or multiple stages, to provide a clad strip having a desired gauge.

The stainless steel plate and the plate of cladding material may be composed of any suitable stainless steel type. As non-limiting examples, and, as noted with respect to embodiments discussed above, the stainless steel plate may be composed of T-316L, T-316, T-304L, or T-304 stainless steel, or any other austenitic stainless steel, and the cladding material may be nickel, a nickel alloy, copper, a copper alloy or a stainless steel. The framing element material is selected, in part, based on the requisite hot strength needed in light of the hot strength of the cladding material. Non-limiting examples of possible framing element materials include T-316L stainless steel, T-304 stainless steel, or any austenitic stainless steel, nickel-base superalloys, and cobalt-base superalloys. More generally, suitable framing materials include those that have hot strength greater than the cladding material, that can be hot worked at the hot rolling temperatures employed, and that have coefficient of thermal expansion similar to the other materials in the welded assembly so that significant stresses do not occur and result in weld failure.

In certain embodiments, the plate of the cladding material has a length and a width, respectively, that are less than a length and a width of the plate of the substrate material. The plate of the cladding material is disposed on a surface of the stainless steel plate so that the plate of the cladding material is spaced from the edges of the stainless steel plate and so that a margin extends around the entire periphery of the stainless steel plate. One or more framing elements are disposed in the margin around the entire periphery of the plate of the cladding material.

As noted above, the method of the present disclosure may be applied for producing multiple-clad products, such as dual-clad products. In the case where the product is a dual-clad product, the welded assembly may be provided by disposing a plate of an alloy cladding material on each of the opposed surfaces of plate of a substrate material, such as a stainless steel. The plates are arranged so that at least a first edge of each of the plates of the cladding material does not extend to a first edge of the stainless steel plate and thereby provides a margin on each of the opposed surfaces of the stainless steel plate. At least one framing element composed of an alloy having hot strength greater than the cladding material is provided in the margin and adjacent the first edge of each plate of cladding material. Each plate of cladding material and the stainless steel plate are welded to the framing elements.

Yet another aspect of the present disclosure is directed to a method for producing a clad stainless steel wherein the method includes hot rolling a welded assembly to provide a hot rolled band. The welded assembly includes a stainless steel plate welded to a plate of a cladding material that is an alloy. The plate of cladding material is disposed in a recess on a surface of the stainless steel plate such that a projecting portion of the stainless steel plate defines the recess and surrounds the peripheral edge of the plate of cladding material. The projecting portion of the stainless steel plate inhibits the cladding material from spreading beyond an edge of the stainless steel during the hot rolling. The method optionally further includes annealing the hot rolled band, and cold rolling the hot rolled band to a clad strip having a desired gauge. In those embodiments wherein the method is applied to produce a dual-clad product, the welded assembly includes two plates of an alloy cladding material. Each plate of cladding material is disposed in a recess on each of the opposed surfaces of the stainless steel plate such that a projecting portion of the stainless steel plate on each opposed surface of the stainless steel plate defines the recess on the particular surface of the stainless steel plate and surrounds a peripheral edge of the plate of cladding material disposed in the recess.

A further aspect of the present disclosure is directed to a method of making a dual clad stainless steel strip. The method includes providing a welded assembly by a process including disposing a plate of a cladding material selected from nickel and a nickel alloy within a recess on each opposed surface of a stainless steel plate so that a projecting margin on each opposed surface of the stainless steel plate defines the recess on that surface and surrounds the peripheral edge of the plate of cladding material within the recess. Each plate of the cladding material is welded to the adjacent projecting margin of the stainless steel plate. The welded assembly is hot rolled to a hot rolled band, and the projecting margin of the stainless steel plate inhibits the cladding material within a recess from spreading beyond the stainless steel during the hot rolling. The hot rolled band subsequently may be cold rolled to a desired gauge.

The present disclosure is additionally directed methods of making articles of manufacture including providing a clad product by any of the novel methods described in the present disclosure, and fabricating the clad product into the article of manufacture. Articles of manufacture that may be made by such methods include, for example, chemical cisterns, chimney flues, batteries, tubing, heat exchangers, piping for oil and gas, tanks for chemicals, and cookware.

Yet an additional aspect of the present disclosure is directed to welded assemblies made as described in the present disclosure and which are useful for making clad products.

The novel methods of the present disclosure for providing clad strip and other clad products do not require the use of a vacuum furnace or explosive cladding equipment. As such, the present methods offer advantages in terms of complexity and cost relative to the prior art processes described in the background section above.

The reader will appreciate the foregoing details and advantages of the present disclosure, as well as others, upon consideration of the following detailed description of embodiments. The reader also may comprehend additional details and advantages of the present disclosure upon making and/or using the method and/or the apparatus set forth in the disclosure.

DETAILED DESCRIPTION

Embodiments of the invention of the present disclosure relate to methods for cladding one or more surfaces of an alloy substrate with an alloy cladding material. The invention of the present disclosure is particularly useful when the one or more cladding materials have lower hot-strength than the substrate material.

Embodiments of the present method may be performed using welding, hot rolling, cold rolling and annealing techniques and equipment known to those having ordinary skill in the metallurgical arts, but the method includes features not heretofore used to produce clad alloys. For example, such embodiments employ novel techniques to contain the spread of lower hot-strength cladding materials during hot rolling.

As further described below, certain embodiments of the method of the present disclosure involve providing a welded assembly including plates of the substrate and cladding materials such that the one or more plates of the cladding material are "framed" with a material having higher hot-strength than the cladding material. The welded assembly is then subjected to a suitable combination of processing steps, including hot rolling, cold rolling and, optionally, annealing, to bond the cladding material to the substrate material and obtain the desired dimensions and metallurgical and mechanical properties in the clad product. During hot rolling, material framing the cladding material inhibit the cladding material from spreading beyond the substrate material, thereby maintaining the cladding material in the proper locations and maintaining the desired range of material thickness during hot rolling. Thus, suitably framing the cladding material about the substrate material may provide a high level of dimensional control so that the final clad product meets required dimensional characteristics.

As used herein, "alloy" means pure metals and metals including incidental impurities and/or purposeful additions of metals and/or non-metals.

As used herein, "plate" means a structure having a generally polygonal or rectilinear perimeter, having length and width dimensions, and including a relatively small thickness dimension.

As used herein, "hot strength" means the yield strength of a material at hot rolling temperatures (for example, typically 1700 to 2400° F. for rolling nickel-clad stainless steel).

Figure 1:
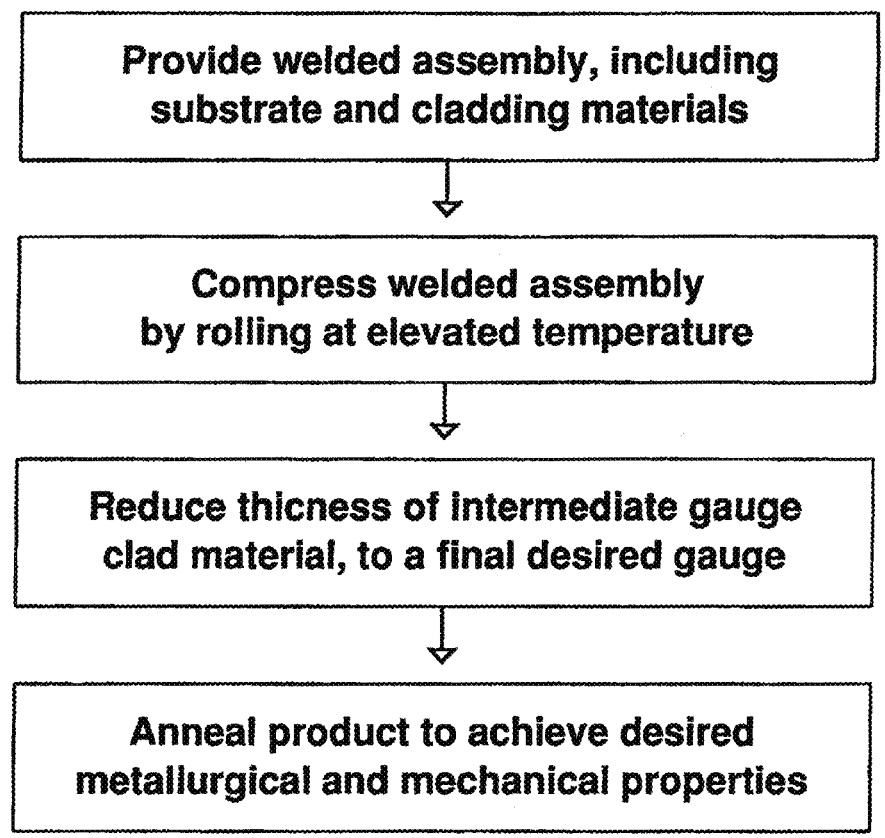
FIG. 1 is diagram of one embodiment of the method for producing a clad product of the present disclosure.

One embodiment of the method of the present invention includes the steps generally shown in FIG. 1. Those steps are (1) providing a welded assembly" suitable to produce the desired clad product; (2) compressing the clad pack by rolling the pack at elevated temperature to bond (clad) the various plates in the clad pack at their interfaces; (3) reducing the thickness of intermediate gauge clad material to a final desired gauge; and, optionally, (4) annealing the product to achieve desired metallurgical and mechanical properties. These steps are further described below.

Figure 2:
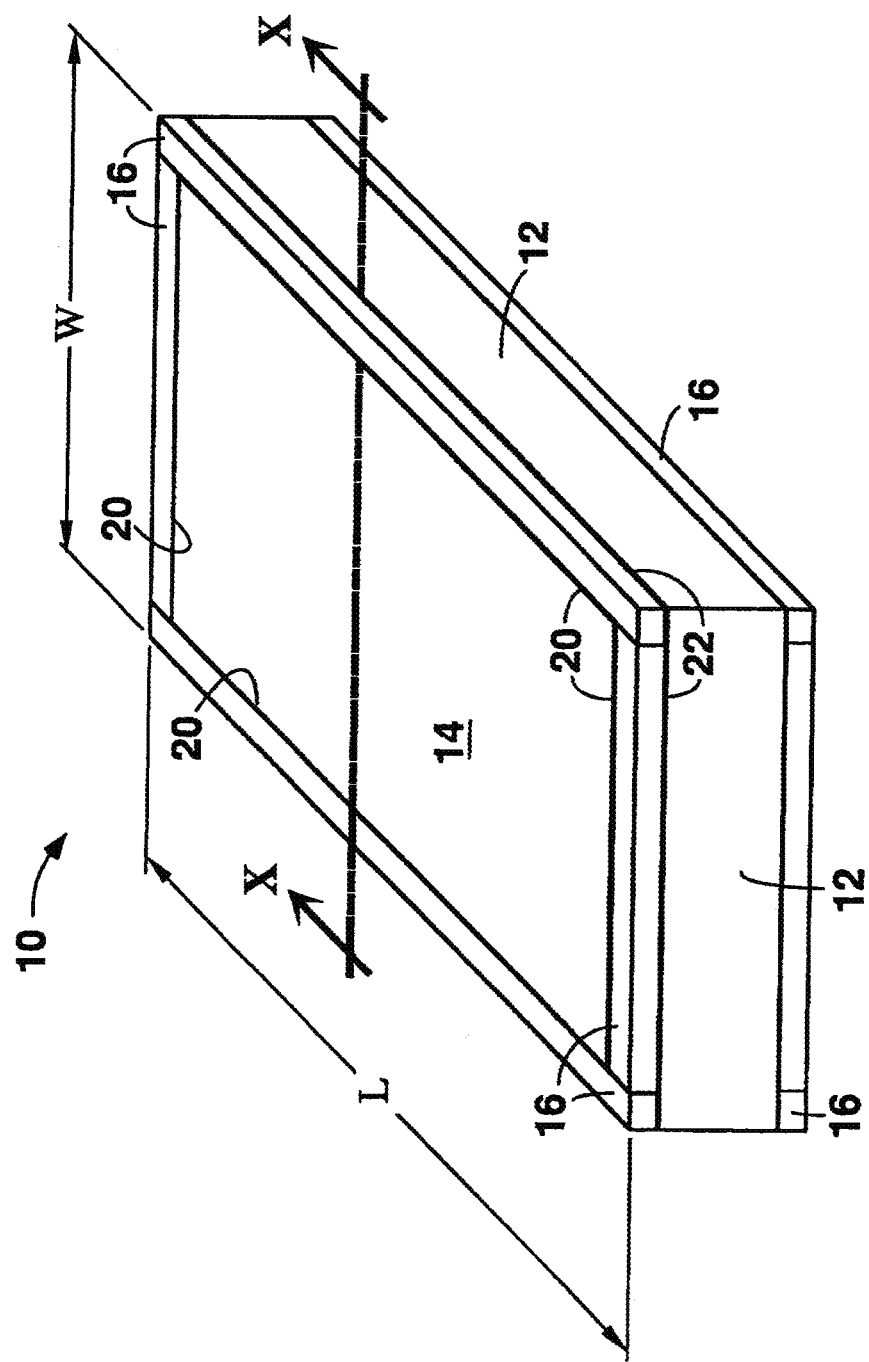
FIG. 2 is a schematic perspective view of one embodiment of a welded assembly according to the present disclosure wherein the assembly includes a plate of a substrate material, plates of a cladding material, and a plurality of framing elements.

In the first step of the method of FIG. 1, a plate or other shape of the alloy to be clad and one or more plates or other shapes of the cladding material (the cladding material plates/shapes may be of the same or different materials) are assembled and welded to form a stacked arrangement, which is then welded together. Such a welded arrangement is referred to herein as a "welded assembly" for ease of reference. For example, as shown in FIG. 2, in one embodiment of the present disclosure for producing a double-clad nickel/stainless steel/nickel product, assembly 10 is formed by positioning a plate 12 composed of Type 316L stainless steel (UNS S31603) ("T-316L") between a first thinner gauge plate 14 of Type 201 nickel (UNS N02201) and a second identical plate (not shown). The length ("L") and width ("W") face dimensions of the nickel plates 14 are less than the corresponding dimensions of the stainless steel plate 12 so that a "frame" composed of several lengths of Type 304 stainless steel (UNS S30400) ("T-304") bar stock 16 can be placed around each nickel plate 14. The framing material has a hot strength that is greater than the hot strength of the cladding material. The stainless steel bar stock 16 has generally the same thickness as the nickel plates 14, is placed directly against each of the four edges of the nickel plates 14 and rests directly on the opposed surfaces of the stainless steel plate 12. The individual bar stock 16 elements are chosen so that their outer edges line up substantially flush with the outer edge of the stainless steel plate 12. The bar stock 16 width is chosen so that the hot strength of the framing material is greater than the hot strength of the nickel cladding material and contains the softer nickel material during hot processing.

After the various elements of the assembly 10 are assembled, the assembly is arc welded together completely around the two exposed seams on each side of the pack using stainless steel welding filler metal. A first seam 20, between a nickel plate 14 and the surrounding stainless steel bar stock 16, is identically present on both sides of the clad pack 10 (one side shown in FIG. 2). A second seam 22, which is the peripheral seam between the stainless steel plate 12 and the stainless steel bar 16, also is identically present on both sides of the clad pack. FIG. 2 schematically depicts a butt weld joint with a square groove for each of these seams. As is known in the art, bevels also may be machined or otherwise formed on the edges of the elements to be welded to aid in obtaining the appropriate penetration of the weld metal. Also, although particular manner or manners of welding the assembly is described in connection with the present embodiment, any suitable manner of welding together the various elements of an assembly may be used. For example, in certain embodiments a discontinuous weld may be used to connect one element of the assembly to another assembly, which may reduce expense associated with the welding step.

Once welded in place, the stainless steel bar stock 16 forming the framing inhibits the relatively lower hot-strength nickel cladding material from spreading beyond the stainless steel substrate material during hot rolling. This aids in positioning the cladding material at the proper locations and in maintaining the desired ratio of thickness of the stainless steel core layer and nickel cladding layers throughout the production process. Although in this example the framing elements are in the form of stainless steel bar stock, it will be understood that the framing elements may be of any alternate material having hot strength greater than the nickel cladding material and that is suitable to inhibit the cladding material from spreading beyond the substrate material during hot rolling.

Figure 3:
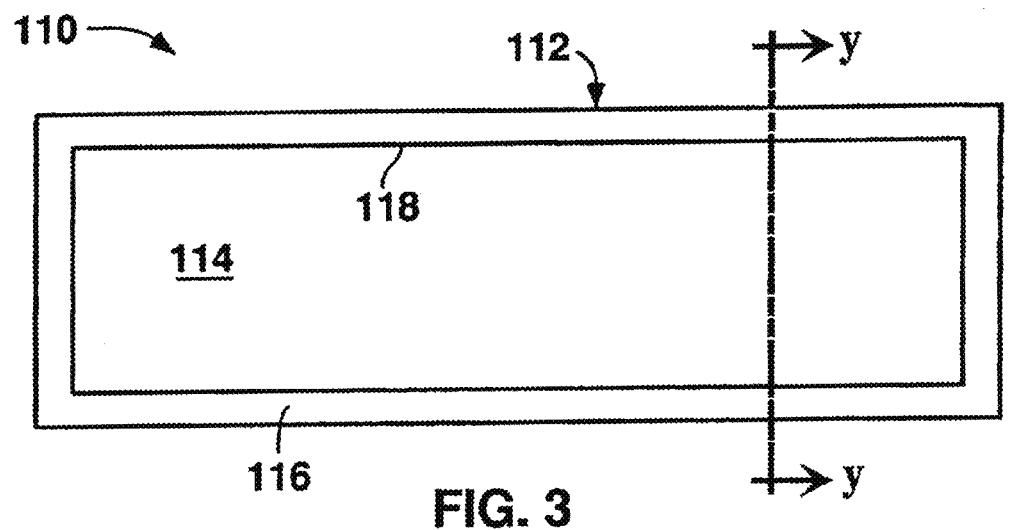
FIG. 3 is a schematic top view of another embodiment of a welded assembly according to the present disclosure wherein the assembly includes a plate of a substrate material that has been machined to include a recess and marginal frame, and wherein a plate of a cladding material is disposed in the recess.
Figure 4:
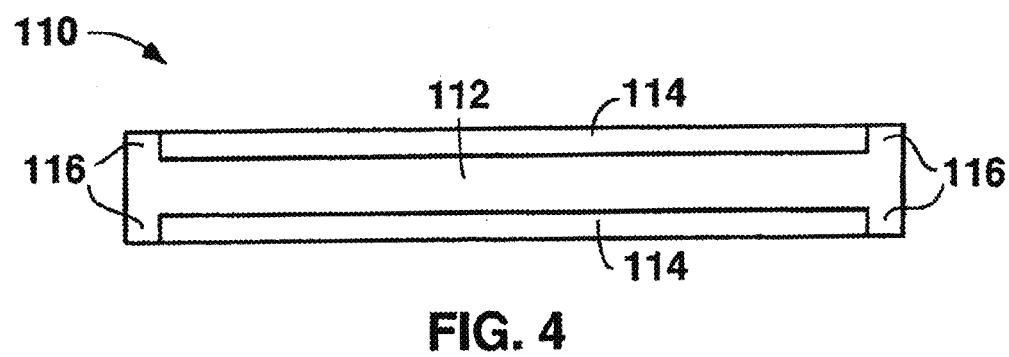
FIG. 4 is a schematic cross-sectional view taken at Y-Y through the assembly of FIG. 3.

FIG. 3 schematically depicts a top view of one alternate construction of a welded assembly 110 according to the present invention. FIG. 4 schematically depicts a cross-section taken at line Y-Y through assembly 110 of FIG. 3. T-316L stainless steel plate 112 is partially sandwiched between nickel cladding plates 114, which may be composed of, for example, UNS N02201 nickel. The stainless steel plate 112 is subjected to machining or another material removal process, or is cast or forged, so as to include a projecting marginal frame 116 on both sides of stainless steel plate 112. The frame defines a recess having dimensions suitable to receive a nickel plate 114. It will be understood that FIG. 4 shows both nickel cladding plates 114 in place in recesses on opposed surfaces of the stainless steel plate 112 that are defined by frame 116. Frame 116 is a projecting portion of the stainless steel plate 112 and frames the perimeter of each stainless steel plate 112. The seams, including seam 118, between the nickel plates 114 and the stainless steel frame 116 are welded using stainless steel filler wire. This welded assembly design has the advantage that bar stock or other framing elements are unnecessary since the T-316L stainless steel core material also serves the function of the frame around the cladding material. In addition, the alternate design requires less welding than the design of FIG. 2.

In the second step of the method of FIG. 1, the welded assembly is heated to high temperature and compressed by hot rolling to an intermediate gauge, thereby forming a hot rolled band or strip. Hot rolling causes the three plates in the welded assemblies shown in FIGS. 2-4 to bond together at their interfaces. The welded assembly 10 of FIG. 2, for example, may be heated to a suitably high temperature in air in a standard furnace, and then immediately rolled on a standard hot rolling mill used in steel production. In one embodiment, the heated assembly 10 is rolled back and forth on a reversing mill until its temperature is reduced to a point that it can no longer be rolled in this manner. If necessary, the compressed and elongated assembly 10 may then be re-heated to high temperature and again hot rolled on a reversing mill to further reduce its gauge. A series of steps of re-heating and hot rolling may be employed until the thickness of the clad pack is reduced to a desired thickness or to a thickness suitable for cold rolling.

Figure 5:
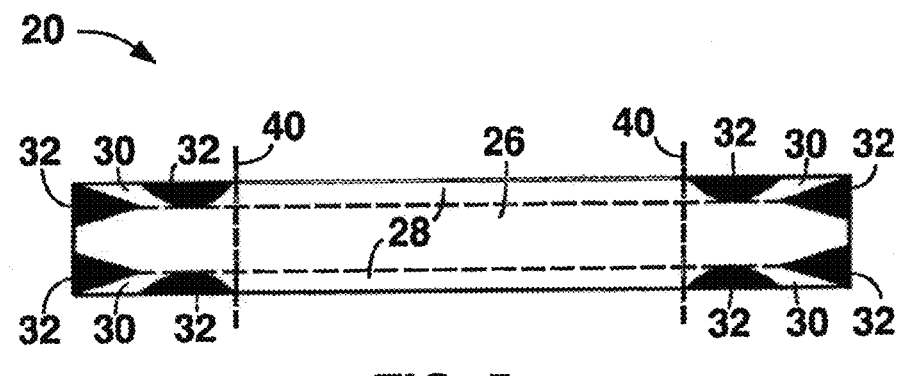
FIG. 5 is a schematic cross-sectional view taken at X-X through the assembly of FIG. 2 after hot rolling to a gauge suitable for cold rolling.

FIG. 5 is a schematic cross-sectional view taken at X-X through the welded assembly 10 of FIG. 2 after hot rolling to a suitable intermediate gauge. Hot rolling compresses the stainless steel plate 12 and nickel plates 14 of the welded assembly 10 to the thinner gauge stainless steel core layer 26 and nickel cladding layers 28 of the intermediate gauge product 20 shown in FIG. 5. In FIG. 5, stainless steel bar stock 16 has been compressed to thinner gauge stainless steel framing regions 30, with compressed weld regions 32 interposed between the several layers. The interface of the stainless steel and nickel materials is shown as a dotted line in the schematic view of FIG. 5, as well in FIGS. 6 and 7, described below.

Figure 6:
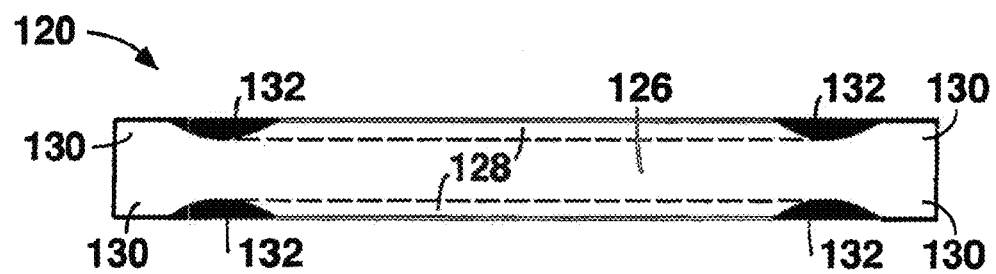
FIG. 6 is a schematic cross-sectional view taken at Y-Y through the assembly of FIG. 3 after hot rolling to a gauge suitable for cold rolling.

FIG. 6 is a schematic cross-sectional view taken at Y-Y through the welded assembly 110 of FIG. 3 after hot rolling to a suitable intermediate gauge. Hot rolling compresses the stainless steel plate 112 and nickel plates 114 of the welded assembly 110 to the thinner gauge stainless steel core layer 126 and nickel cladding layers 128 of the intermediate gauge product 120 shown in FIG. 6. The frame 116 of the stainless steel plate 112 also has been compressed to a thinner gauge stainless steel framing region 130, with compressed weld regions 132 interposed between the stainless steel framing region 130 and the nickel cladding layer 126 on both faces of the clad product.

Figure 7:
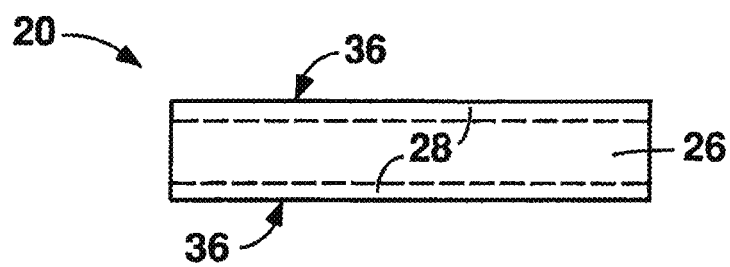
FIG. 7 is a schematic end view of the hot rolled welded assembly of FIG. 5 after trimming of the edges including the welds and framing elements.

The intermediate gauge clad materials shown in FIGS. 5 and 6, now unitary pieces, can be trimmed to remove the edges, including the compressed stainless steel framing regions 30, 130 and weld regions 32, 132, respectively. FIG. 7 is a schematic cross-sectional view taken at X-X through the welded assembly 10 of FIG. 2 after hot rolling to intermediate gauge and after trimming at trim lines 40 shown in FIG. 5. Trimming leaves only the desired stainless steel core layer 26 and nickel cladding layers 28 bonded together. It will be apparent that the general arrangement of elements in a transverse cross-section of the intermediate gauge product 120 once trimmed will be similar to the arrangement shown in FIG. 7.

Subsequent to trimming, the intermediate gauge product 20 of FIG. 7 may be annealed in air or bright annealed to relieve stresses. The opposed nickel surfaces 36 may then be blasted and pickled to remove oxide scale and provide a surface condition suitable for cold rolling to final gauge. If oxide scale is slight, it may be possible to pickle the material without blasting.

The third step of the method outlined in FIG. 1 involves reducing the thickness of the intermediate gauge product formed in a previous step and, if desired, annealing to obtain desired metallurgical and mechanical properties. One or more cold rolling sequences is used, wherein each cold rolling sequence includes a step of cold rolling the material optionally followed by a step of annealing the material to relieve stresses and soften the material for the next cold rolling sequence. If the material is annealed in air during a particular cold rolling sequence, it may be necessary to pickle or blast and pickle the material to remove any oxide scale formed on it before the next cold rolling sequence. If, instead, the material is annealed during a particular cold rolling sequence in an inert, non-oxidizing atmosphere such as, for example, a hydrogen atmosphere, the oxide scale on the material may be negligible and require no blasting or pickling. Cold rolling sequences may be repeated until the material is reduced to the desired final gauge. The clad material may be subjected to a final anneal in hydrogen or another inert atmosphere to obtain desired mechanical properties with a substantially oxide scale-free surface.

Figure 8:
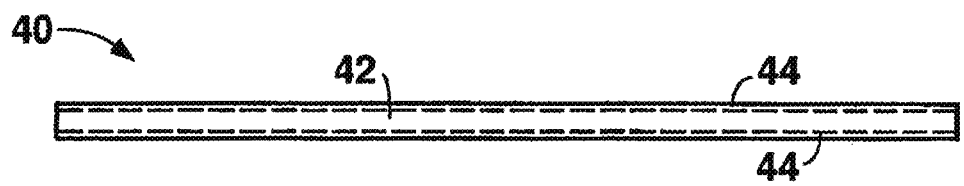
FIG. 8 is a schematic cross-sectional view of a final clad product made by the embodiment of FIG. 1.

An end product formed using the method shown schematically in FIG. 1 is a sheet product comprising an alloy substrate (such as, for example, a T-316L stainless steel) clad on its opposed surfaces with a material imparting desired corrosion resistance and/or other desired properties (such as, for example, nickel). FIG. 8 is a schematic cross-section of a final product 40, wherein the core stainless steel layer 42 is sandwiched between nickel cladding layers 44.

Although the above exemplary embodiments used to illustrate the method shown in FIG. 1 are directed to producing dual-clad products, it will be understood that the method of claim 1 is equally useful for producing single-clad products, i.e., products clad on only a single face of the substrate material. It also will be understood that the various schematic depictions of FIGS. 2-8 are provided only to better illustrate certain non-limiting embodiments of the methods of the present disclosure and may not depict the true relative dimensions of the various elements as would exist in a commercial-scale process. For example, it is likely that the cladding layer thickness would be significantly thinner relative to the substrate layer thickness in an actual mill-scale process.

A significant advantage of the embodiment of FIG. 1 is that the method does not require either the rolling of the assembled materials into a tight coil or the use of a vacuum furnace to heat and bond the assembled materials as used in the prior art methods discussed in the background section above. Although the materials to be bonded must be heated to high temperature in the cladding method of the present disclosure, it is believed that the bonding of the material during the cladding process actually is more a result of the high interface pressure achieved during rolling. The embodiment of FIG. 1 also does not require the use of complicated and costly explosive bonding equipment to bond the various materials.

Although the above description and the examples below either mention or involve the cladding of nickel on a stainless steel substrate, it will be understood that the methods of the present disclosure are not so limited. It is believed that the method of FIG. 1 and, more generally, the novel method of the present disclosure may be adapted to produce a wide variety of single-clad and multiple-clad alloy substrates. Also, as noted above, the method of the present disclosure is particularly useful for producing clad products wherein the cladding material is of a lower hot strength than the substrate material. When rolling stacked plates of a high hot strength substrate material and a lower hot strength cladding material, the lower hot strength material can tend to spread beyond the dimensions of higher hot strength material during hot rolling of the assembled materials. In such case, the higher hot strength material provided in the margin between adjacent edges of the cladding material and the substrate material in the welded assembly of the method of the present disclosure, whether or not a part of the substrate material, inhibits spreading of the cladding material beyond the edge of the substrate material during hot rolling.

Generally, non-limiting examples of clad products that can be produced using the method of the present invention include the following: clad plate, clad strip and clad sheet. The clad products may be further processed into various articles of manufacture. Also, although the above descriptions and the examples below are directed to double-clad products, wherein cladding layers are bonded to each of the opposed surfaces of a substrate, the method of the present disclosure may be adapted to produce either single-clad and multiple-clad products, and such products may be further processed into articles of manufacture. As noted above, examples of articles of manufacture that may be made from single-clad and/or double-clad products made using the method of the present disclosure include, but are not limited to, chemical cisterns, chimney flues, batteries, tubing, heat exchangers, piping for oil and gas, tanks for chemicals, and cookware. Other products and articles of manufacture that can be made using the method of the present disclosure will be apparent to those having ordinary skill in the metallurgical and manufacturing arts upon considering the present description and such persons may suitably adapt the method of the present disclosure without undue experimentation.

The absolute and relative dimensions of the various substrate, cladding and, if distinct from the substrate, framing elements assembled into a welded assembly in the method of the present disclosure are chosen to provide a suitably dimensioned final clad product. Examples of certain non-limiting embodiments of the present invention follow. The absolute and relative dimensions of the various elements described in the following examples were chosen for a particular application and reflect only several non-limiting examples of specific embodiments of the method. More generally, depending on the particular intended application of the clad product, any of a wide range of final clad product thicknesses and thickness ratios can be produced in a manner similar to that used in the above description and the following examples. Aspects investigated while carrying out the following examples include inhibiting the cladding layer from flowing to an undesirable degree during hot rolling, suitably annealing the cladding and substrate layers during cold rolling, preventing formation of excessive scale on the cladding layer surfaces during annealing, and the ability of blast and pickling practices to remove undesirable scale prior to assembling the elements of the welded assembly.

Example 1

A welded assembly was prepared to produce a nickel double-clad stainless steel. The assembly comprised a 2 to 2½ inch thick T-316L stainless steel plate sandwiched between two ½ to ¾ inch thick nickel (UNS 02201) plates. The length and width dimensions of the nickel cover plates were smaller than the stainless steel core plate, and the nickel plates were centered on the faces of the stainless steel core plate. In this way, a margin was left around the perimeter of each face of the core plate that was not covered by the cover plate disposed on the face. A frame constructed of ½×½ inch thick T-304 stainless steel bar stock was positioned in the margin on each face of the core plate, around the periphery of each of the cover plates. The stainless steel frame was intended to "dam" the lower hot strength (and therefore more fluid) nickel during hot rolling and to inhibit or prevent the nickel material from flowing beyond the edges of the core plate material as the entire assembly was reduced in thickness during hot rolling. The thicknesses of the individual plates were selected, in part, so that the rolling equipment available for the trial could accommodate the total assembly thickness.

Figure 9:
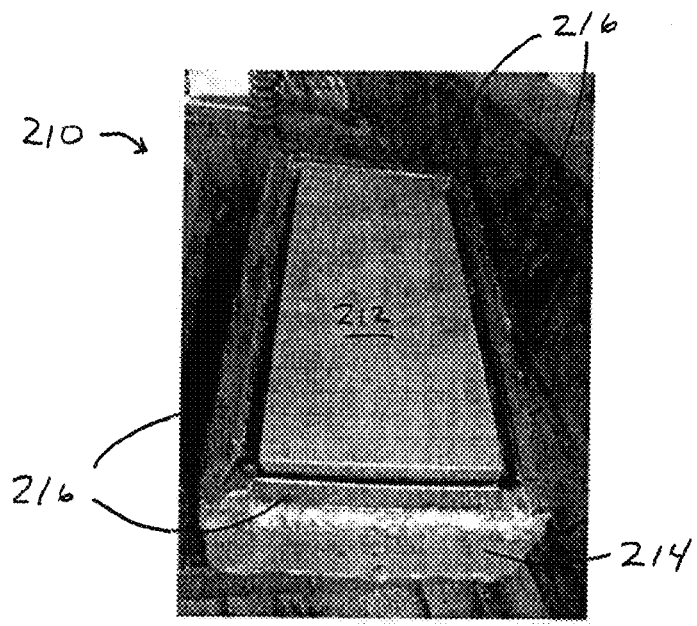
FIG. 9 is a photograph of an embodiment of an assembly constructed according to an embodiment of the method of the present disclosure.
Figure 10:
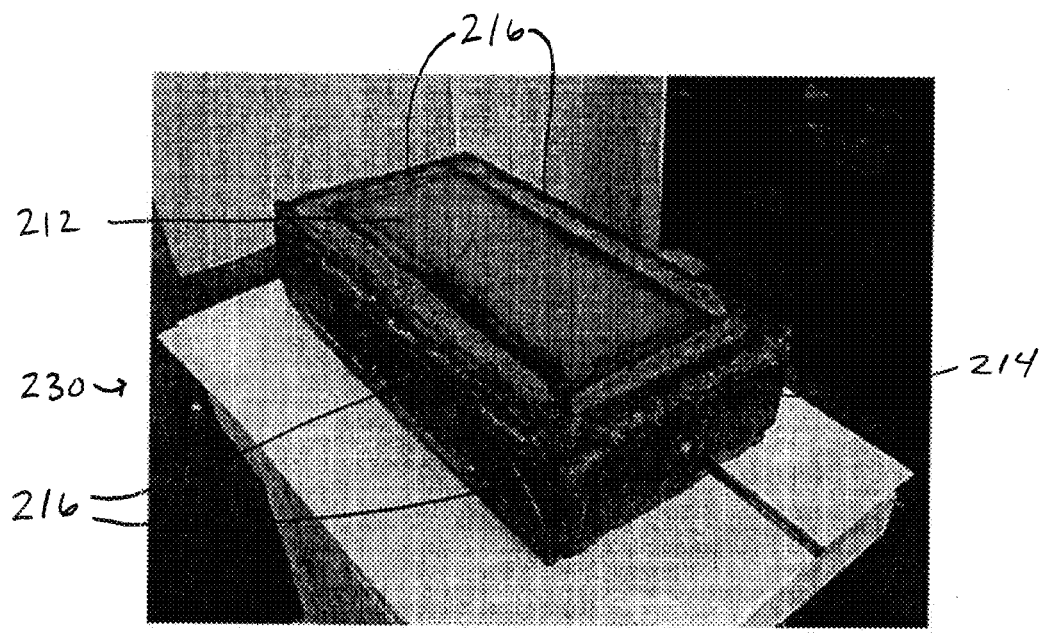
FIG. 10 is a photograph of the assembly of FIG. 9 wherein the elements of the assembly have been welded together to provide a welded assembly.

The assembly was constructed and processed as follows. The two nickel cover plates were cut so that when the elements were assembled a ½ inch gap was left between their edges and the opposed edges of the T-304 stainless steel frame elements. This is shown in the photograph of FIG. 9, wherein the assembly 210 includes a nickel cover plate 212 disposed on T-316L stainless steel plate 214 between T-304 stainless steel framing elements 216, leaving a ½ inch gap 218 around the cover plate 212. The ½ inch gap was provided to increase penetration of weld metal during welding. Each of the framing elements 216 was MIG welded to the core plate 214 at the exposed interface between those elements running the circumference of the assembly using 1/16 inch diameter ER308 welding wire and 98% argon/2% oxygen shielding gas. The framing elements 216 also were MIG welded to their respective adjacent cover plate 212 by filling the ½ inch gaps between those elements using 3/32 inch diameter INCO 92™ ERNiCrFe-6 welding wire and 95% argon/5% hydrogen shielding gas. The completed welded assembly 230 is shown in FIG. 10.

Figure 11A:
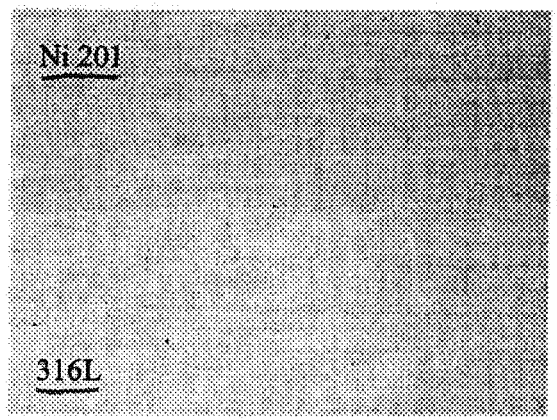
FIGS. 11(a) and (b) are micrographs of an interface region of the bonded substrate and cladding layers of the welded assembly of FIG. 10 after hot rolling.
Figure 11B:
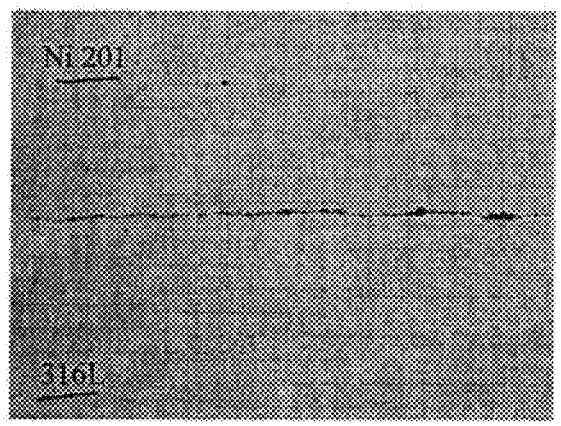

The welded assembly was heated to 2050° F. in a furnace and hot rolled from its original 3 inch thickness down to 0.401 inch. The assembly was not evacuated prior to hot rolling. Micrographs of a cross-section of the hot rolled assembly, shown in FIGS. 11(a) and (b), revealed that both of the nickel/T-316L stainless steel interfaces were completely bonded with a generally very clean interface. However, occasional regions of the nickel/T-316L stainless steel interface included significant entrapped oxide scale. It was unclear at the time whether the entrapped scale was embedded in the plate surfaces prior to hot rolling, was formed during hot rolling due to the presence of air in the welded assembly, or was present due to a combination of both factors.

Two sections were cut from the hot rolled clad pack assembly and reheated, a first section to 2050° F. and the second section to 2200° F. Each reheated section was then hot rolled, the first section to 0.142 inch and the second section to 0.125 inch. The hot rolled sections were then trimmed to remove the framing material and weld deposits, so that the only material left was a nickel/T-316L stainless steel/nickel laminate. Metallographic inspection of the laminate revealed that all layers remained well bonded.

Figure 12:
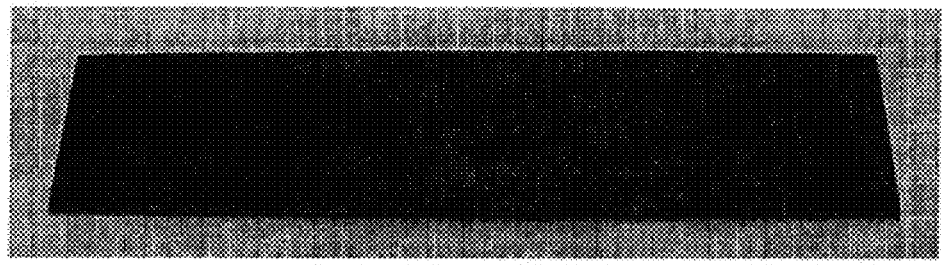
FIG. 12 is a photograph of a section of a hot rolled band produced by an embodiment of the method of the present disclosure.

Annealing studies discussed below indicated that an anneal at 1950° F. for 5 minutes was sufficient to soften the hot rolled sections for subsequent cold rolling. Accordingly, a 3×14 inch piece of the 0.142 inch thick hot rolled double-clad material, shown in FIG. 12, was annealed at 1950° F. for five minutes, and then cold rolled to 0.013 inch final gauge using the following cold rolling/annealing sequence:

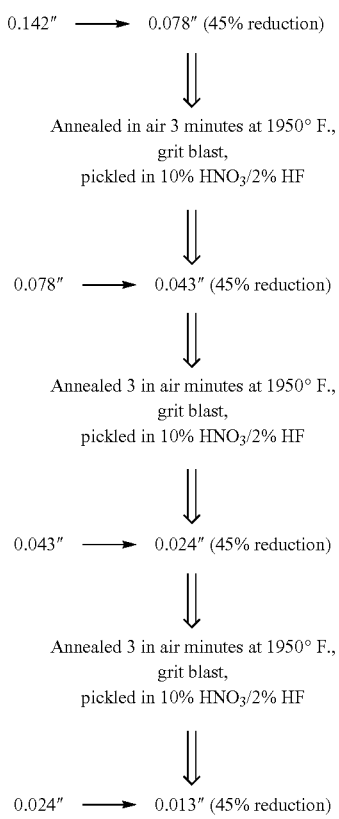

Any single roll pass during cold rolling was limited to about 0.005 inch reduction so as to limit stresses and reduce the risk of delamination. No delamination or edge checking was observed during any of the cold rolling sequences. To condition the surface of the 0.013 inch final gauge material, a blast and pickle operation may be used.

The percentage thickness of nickel cladding was measured for each stage of processing of the welded assembly in this Example 1 in order to evaluate how well the nickel remained contained within the T-304 stainless steel framing, and also to determine whether the formation of oxide scale consumed an excessive amount of the nickel cladding during annealing. The nickel layer thickness remained fairly constant from its original amount (16.5 to 17% of total assembly thickness per side) through the third cold rolling/annealing cycle. The nickel cladding layers became relatively thinner during the final cold rolling sequence, and the final gauge material had a nickel cladding layer thickness of about 15% of total clad product thickness per side.

To avoid the risk of distortion to the material surfaces during blast and pickling, bright annealing in hydrogen may be used in place of annealing in air in the above cold rolling series and to provide the material with its final grain size and mechanical properties. To evaluate the use of bright annealing, individual 1×1 inch specimens of final gauge (0.013 inch) cold rolled material were bright annealed at 1500° F., 1600° F. and 1700° F. for each of 1, 2 and 3 minutes time-at-temperature. The bright annealing appeared to provide an acceptable scale-free surface on the double-clad specimens. Metallography was performed on the bright annealed specimens to determine what microstructure resulted from the nine temperature-time combinations. The nickel layers on all nine specimens appeared metallographically similar, with each layer being fully recrystallized, having noticeable grain growth, and a grain size of about 7½ to 8 using the ASTM Comparison Method. It was observed that only those specimens bright annealed to at least 1600° F. for at least 2 minutes were fully recrystallized. The fully recrystallized stainless steel core layers had a grain size of approximately ASTM 11, and the specimen bright annealed at 1700° F. for 3 minutes appeared to have the most homogenous microstructure. The average Vickers microhardness of the T-316L core layer for the bright annealed specimens was 178.

Considering the foregoing bright annealing results, a 3×12 inch piece of the as-cold-rolled final gauge material from this example was bright annealed in hydrogen at 1700° F. for 3 minutes. Two tensile test specimens were stamped from this material and the yield strength, ultimate tensile strength, and percent elongation were evaluated. The average test values for these properties were 40.7 ksi, 86.6 ksi and 48.7%, respectively.

Example 2

Figure 13:
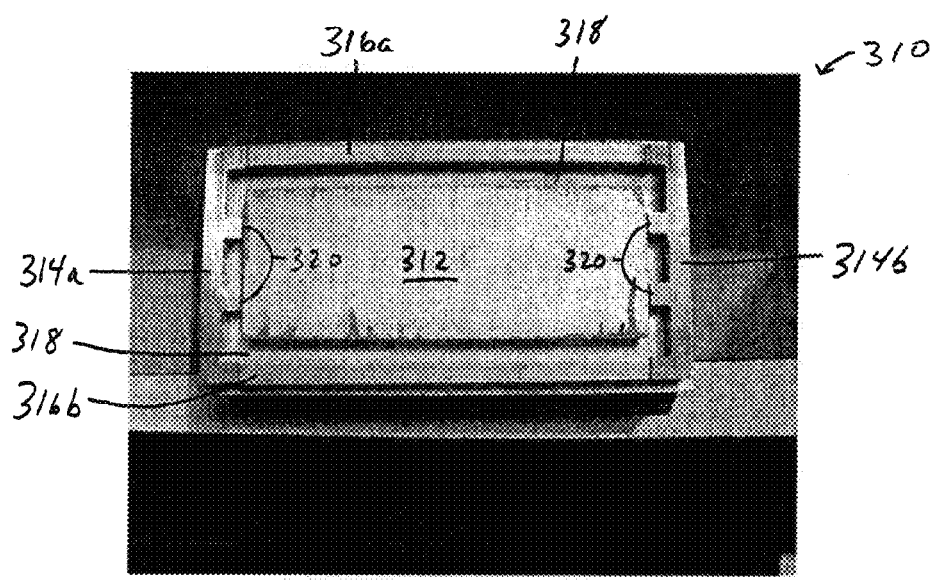
FIG. 13 is a photograph of another embodiment of an assembly constructed according to an embodiment of the method of the present disclosure.

A welded assembly constructed substantially the same as in Example 1 was prepared. As in the assembly of Example 1, a ½ inch gap was left between each of the nickel cover plate edges and the edges of the stainless steel framing material. In order to provide extra support against any lateral movement of the cover plates during rolling, but to still allow space for the cladding material to flow, two short end dams were designed into the framing elements such that each included two ½ inch tabs that mate flush against the adjacent cover plate. This arrangement is shown in FIG. 13, which shows one surface of the assembly 310 in which nickel plate 312 and T-304 stainless steel framing elements 314, 316 are positioned on T-316L stainless steel plate 318. Opposed framing elements 314 include tabs 320 flush with the adjacent cover plate 312. The nickel cover plates and framing elements 314, 316 were then welded in place on the stainless steel core plate 318 in a manner similar to the assembly of Example 1.

Figure 14:
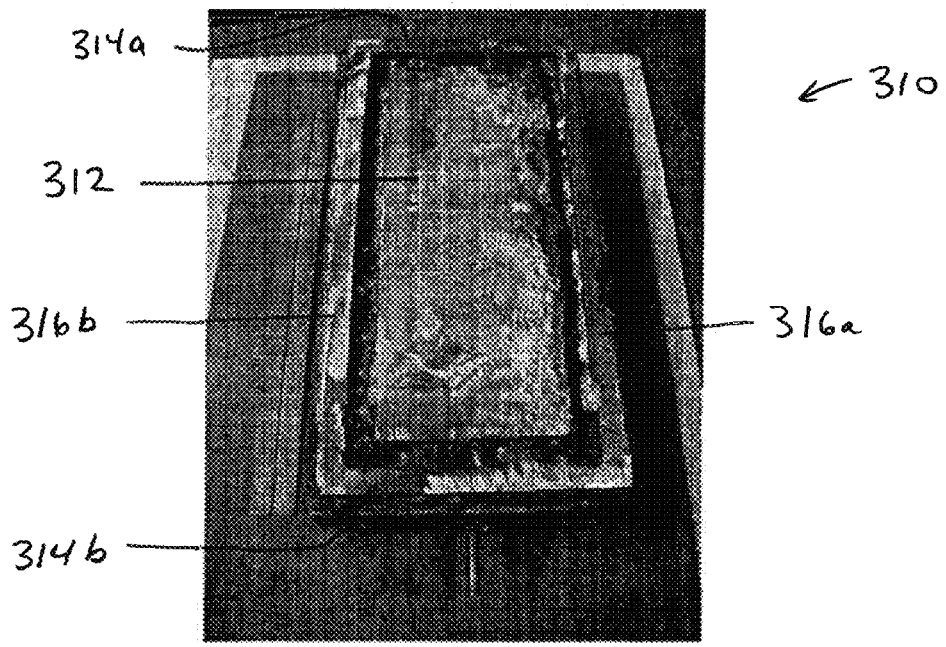
FIG. 14 is a photograph of the assembly of FIG. 13 wherein the elements of the assembly have been welded together to provide a welded assembly.

A surface of the welded assembly is shown in FIG. 14. The welded assembly of this example was then heated to 2050° F. and hot rolled from its original 3-inch thickness down to 0.400 inch. The assembly was not evacuated prior to hot rolling. Metallographic analysis performed on the hot rolled material showed the nickel/T-316L stainless steel interface to be similar to that produced with the welded assembly of Example 1, though one end of the hot rolled band included a shallow area of delamination between the nickel and stainless steel core material. A section of the 0.400 inch piece was re-heated to 2050° F. and hot rolled to 0.143 inch.

An annealing study was performed on samples of the 0.143-inch hot rolled material to investigate suitable temperatures and times for annealing the hot rolled material prior to cold rolling. Five pairs of 2×3 inch samples of the hot rolled material were annealed at 1950° F. for 2, 5, 8, 14 and 20 minutes. The specimens annealed at 1950° F. for 5 minutes appeared to produce a fully recrystallized microstructure in both the T-316L core layer and nickel cladding layers without excessive grain growth in the layers.

Example 3

Figure 15:
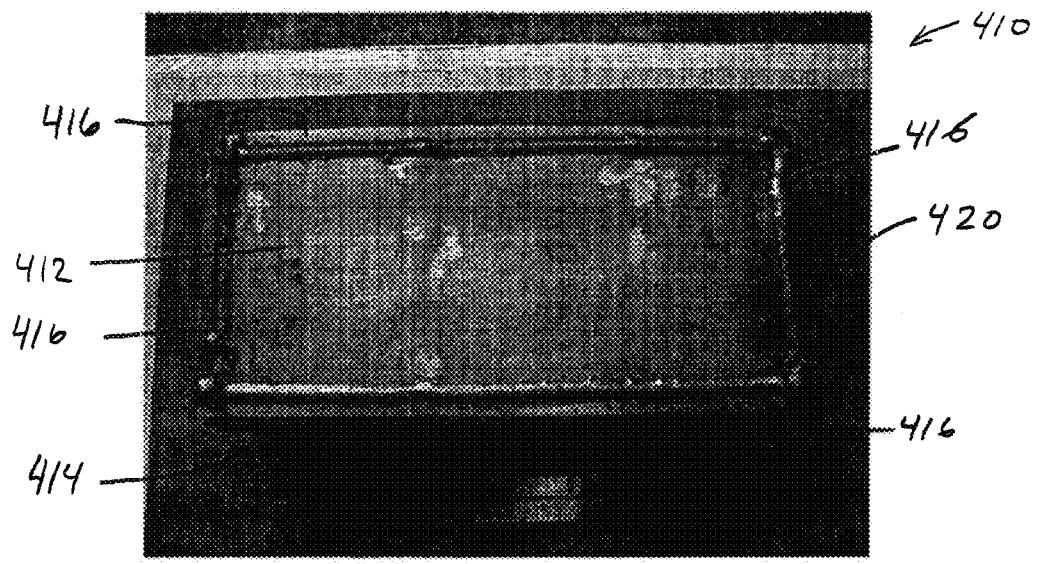
FIG. 15 is an additional embodiment of a welded assembly constructed according to an embodiment of the method of the present disclosure.

Observation of the assemblies of Examples 1 and 2 above indicated that the nickel cover plate material did not flow over the stainless steel framing and was fully contained within the framing during hot rolling reduction. Thus, the ½ inch gap between cover plates and the framing elements was eliminated in the assembly of this Example 3. It is believed that such design may provide a higher yield of double-clad material since without the gaps the cover plate can cover a larger percentage of the surface width of the core plate. FIG. 15 shows the welded assembly 410 of Example 3 with the cover plate 412 welded to the butted-up framing elements 416 and the framing elements 416 welded to the core plate 414. As shown in FIG. 15, hydraulic tubing 420 was welded to an evacuation bore in the side of the 2-inch thick core plate 414. The evacuation bore passed into the core plate 414 and intersected at a right angle with a bore drilled entirely through the core plate 414, opening at the two faces of the core plate 414 covered by the cover plates 412. As such, the evacuation bore and hydraulic tubing 420 fluidly communicated with the spaces between the core plate 414 and the cover plates 412. Most of the air in the welded assembly 412 was evacuated through tubing 420, and the evacuation bore in the assembly 412 was then welded shut prior to hot rolling.

The evacuated welded assembly was hot rolled at 2050° F. to 0.402 inch, and subsequently re-heated to 2050° F. and hot rolled to 0.138 inch. Metallographic analysis was performed on the material at each thickness. The samples examined showed that the nickel/T-316L stainless steel interfaces were completely bonded with no evidence of voids or large oxide inclusions. The samples exhibited inclusions in an amount, sizes, and distribution very similar to what was seen in hot rolled samples of the welded assemblies of Examples 1 and 2. This indicated that the inclusions found at the core/cladding interfaces are not due to the presence of air within the welded assemblies, but instead from scale present on the plates' contacting surfaces before construction of the welded assembly. It therefore appears that it is unnecessary to evacuate the welded assembly constructed according to embodiments of the method of the present disclosure prior to hot rolling. It also follows that preparing the plates' surfaces by surface grinding and/or other surface preparation techniques to remove surface scale may be important. Of course, the advantage gained from such surface preparation will depend on the composition and condition of the plates used, and certain plates, for example, may be composed of material more likely to develop problematic corrosion.

Example 4

In view of the success of the cold rolling schedule used with the hot rolled material produced in Example 1, a more aggressive cold rolling schedule was tested on a welded assembly having a construction substantially the same as in Example 1. It was observed that there was no significant difference in the extent of oxide inclusions at the stainless steel core/nickel cladding interface in hot rolled product produced from the evacuated and unevacuated assemblies of the above examples. Thus, the clad pack assembly of Example 4 was not evacuated.

The welded assembly was hot rolled at 2050° F. to 0.401 inch, and subsequently reheated to 2200° F. and hot rolled to 0.119 inch. Half of the 0.119 inch material ("assembly #4-A") was annealed at 1950° F. for 5 minutes to soften it for cold rolling. The remaining half of the 0.119 inch material ("assembly #4-B") was reheated to 2200° F. and hot rolled again for two passes to reduce it to 0.085 inch. The reduced hot band gauge relative to assembly #1A would allow for fewer cold rolling/annealing cycles to reach final gauge. Assembly #4-A was successfully cold rolled to the desired final gauge of 0.013 inch using the following three cold rolling/annealing cycles:

0.119" → 0.057" (52% reduction)

Annealed in air 3 minutes at 1950° F.,
grit blast,
pickled 10 seconds in 10% HNO₃/2% HF

0.057" → 0.027" (52% reduction)

Annealed 3 in air minutes at 1950° F.,
sand blast,
pickled 45 seconds in 10% HNO₃/2% HF

0.027" → 0.013" (52% reduction)

The reduced hot rolled band gauge material of assembly #4-B was successfully cold rolled to the desired final gauge of 0.01 inch using just two cold rolling/annealing cycles as follows:

0.091" → 0.034" (60% reduction)

Annealed in air 3 minutes at 1950° F.,
sand blast,
pickled 45 seconds in 10% HNO₃/2% HF

0.034" → 0.013" (60% reduction)

Any single roll pass during cold rolling in the above two sequences was limited to about 0.005 inch and about 5% reduction so as not to overly stress the material and risk delamination. Respecting these limitations, no delamination or edge checking was observed during any of the rolling steps carried out on assemblies #4-A and #4-B, which indicates that fairly aggressive cold rolling is possible. The final gauge material from assemblies #4-A and #4-B was bright annealed in hydrogen at 1700° F. for 3 minutes, and tensile testing was performed in the bright annealed material. More aggressive cold rolling also was investigated, which can increase production speed. A specimen of annealed and pickled 0.0119 inch hot band material from assembly #4-A was cold rolled as follows:

0.119" → 0.039" (67% reduction)

-continued

Annealed in air 3 minutes at 1950° F.,
sand blast,
pickled 45 seconds in 10% HNO$_3$/2% HF

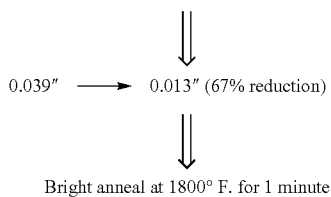

0.039"  →  0.013" (67% reduction)

Bright anneal at 1800° F. for 1 minute

The cold rolling was performed with an approximately 15% reduction in thickness per rolling pass, or about three times the targeted per-pass thickness reduction limit as in the prior cold rolling sequences. The resulting final gauge double-clad material exhibited no signs of delamination, though some edge roughness did occur. However, since the final gauge material would be edge trimmed to a desired width and to remove evidence of the framing material and weld deposits, the edge roughness likely is insignificant. The metallurgical and mechanical properties of the 0.013 inch final gauge bright annealed, cold rolled double-clad material were as listed in Table 1.

TABLE 1

| Property | Average Test Result |
|---|---|
| Nickel ratio | 15.1% (per side) |
| Nickel Thickness | 0.0020 inch (per side) |
| Grain Size | ASTM 7 (Ni) |
|  | ASTM 10 (T-316L) |
| Tensile Strength | 83,900 psi |
| Yield Strength | 37,200 psi |
| Percent Elongation | 46.2% |
| Hardness | 96 HV (Ni) |
|  | 180 HV (T-316L) |
| Bending Test | 4 of 4 bend tests→ no defects |

Example 5

A mill-scale welded assembly was constructed from a 3.75-inch thick T-316L stainless steel plate as core material having length of 132 inches and width of 32.5 inches. The core plate was sandwiched between two 0.75-inch thick UNS 02201 nickel plates having length of 128 inches and width of 28.5 inches. The core plate was machined on both sides to provide recessed regions to accept the nickel plates, which were of smaller length and width dimensions. As such, a margin of the T-316L stainless steel plate encircled or "bordered" the periphery of the cladding material plates and thereby provided an integral frame to inhibit or prevent the nickel cladding material from spreading beyond the dimensions of the stainless steel core material during hot rolling. The nickel plates were welded to the frame defined by the core material generally as described in the examples above. The assembly was then heated to 2050° F. and hot rolled to an intermediate gauge hot rolled band on a mill-scale hot strip mill.

Micrographs of samples from the hot rolled band were examined and showed that the quality of the bonds between the core and cladding layers was very good. The band surface was inspected and found to be acceptable, with the only observed significant flaw being a blister in one location near the strip center. Some insignificant feathering/delamination was observed along the fusion border between the weld deposit and the nickel cladding layer. The hot rolled band was cold rolled, annealed and prepared for leveling.

Example 6

Figure 16:
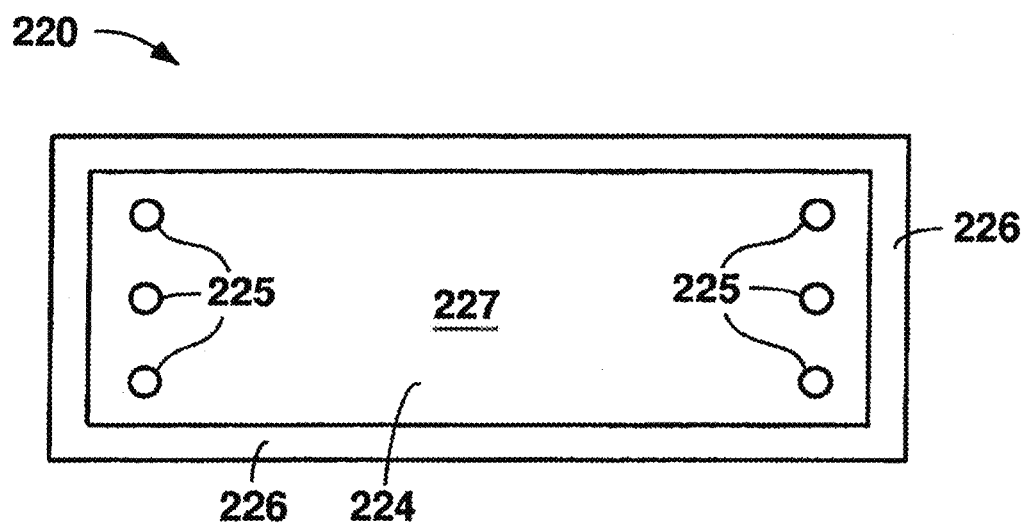
FIG. 16 is a schematic view of one embodiment of a core plate for an assembly according the present disclosure.

A mill-scale welded assembly may be prepared from a 132 inch×32.5 inch (length×width) T-316L stainless steel plate as core material, and two 128 inch×28.5 inch UNS 02001 nickel cover plates as cladding material. The thickness of the core plate may be 3.75 inches, and the thickness of each cover plate may be 0.75 inch, for a total assembly thickness 5.25 inches. A recess shaped to accept a cover plate is machined in each face of the core plate, with three pegs machined at each of the ends of each recess. FIG. 16 is a schematic top view of one face of the core plate 220, showing the recess 224, the projecting margin 226 left on the core plate 220 and defining walls of the recess 224, and the six pegs 225 extending from the surface 227 of the recess 224. The remaining face of the core plate 220 (not shown in FIG. 16) will have a substantially identical design. Each nickel cover plate is machined to include six bores in predetermined positions, and each cover plate is positioned in a recess of the core plate so that the six pegs of the core plate project through the six bores machined in the clover plate. The thickness of the core plate may be 3.75 inches, and the thickness of each cover plate may be 0.75 inch, for a total assembly thickness 5.25 inches. The cover plates are welded to the core plate at the seams between the cover plates and the core plate's projecting margin, and at the seams between the pegs and the bores in the cover plates. The pegs are provided to further inhibit slippage of the cover plates relative to the core plate during hot rolling.

The assembly is heated to approximately 2050° F. and hot rolled on a reversing mill to a hot rolled band of intermediate gauge. The hot rolled band may then be trimmed to a desired width suitable for cold rolling. The hot rolled band is then annealed in air, for example, at 1900° F. for 1 minute time-at-temperature, descaled, optionally pickled and surface ground, and then cold rolled. The cold rolled material is then annealed in air, for example, at 1900° F. for 1 minute time-at-temperature, descaled, optionally repickled and surface ground, and rolled. This material is bright annealed, cold rolled to final gauge, and then bright annealed once again. The material may then be stretcher leveled, if desired.

It will be understood that the present description illustrates those aspects relevant to a clear understanding of the invention. Certain aspects that would be apparent to those of ordinary skill in the art and that, therefore, would not facilitate a better understanding of the invention have not been presented in order to simplify the present description. Although embodiments of the present invention have been described, one of ordinary skill in the art will, upon considering the foregoing description, recognize that many modifications and variations of the invention may be employed. All such variations and modifications of the invention are intended to be covered by the foregoing description and the following claims.

What is claimed is:

1. A method for producing a clad product, the method comprising:
   providing a welded assembly comprising an alloy cladding material plate disposed on a steel plate, and one or more framing elements of an alloy material comprising a hot strength greater than the cladding material plate,
   wherein in the welded assembly a peripheral edge of the cladding material plate does not at any point extend to a peripheral edge of the steel plate, thereby defining a margin between the peripheral edge of the cladding material plate and the peripheral edge of the steel plate, wherein each framing element is disposed in the margin and is directly against the peripheral edge of the cladding material plate and defines a seam between the framing elements and the entire peripheral edge of the cladding material plate, and the alloy material and the cladding material plate are welded together along the seam; and wherein each framing element extends to the peripheral edge of the steel plate and is welded to the steel plate; and wherein in the welded assembly, a surface of the cladding material plate is substantially coplanar with a surface of the each framing element disposed in the margin; and hot rolling the welded assembly to provide a hot rolled band, wherein each framing element inhibits the cladding material plate from spreading beyond the edge of the steel plate during the hot rolling.

2. The method of claim 1, wherein the welded assembly is welded together completely around the seam.

3. The method of claim 1, wherein the steel plate is selected from the group consisting of stainless steel and carbon steel.

4. The method of claim 1, wherein the steel plate is selected from the group consisting of T-316L stainless steel, T-316 stainless steel, T-304L stainless steel, and T-304 stainless steel.

5. The method of claim 1, wherein the cladding material plate is selected from the group consisting of nickel, a nickel alloy, copper, a copper alloy, and a stainless steel.

6. The method of claim 1, wherein the cladding material plate is selected from UNS N02200 nickel and UNS N02201 nickel.

7. The method of claim 1, wherein the alloy material is selected from the group consisting of stainless steel, a nickel-base superalloy, and a cobalt-base superalloy.

8. The method of claim 1, wherein the alloy material is selected from the group consisting of T-316L stainless steel and T-304 stainless steel.

9. The method of claim 1 further comprising:
optionally annealing the hot rolled band; and
cold rolling the hot rolled band to a clad strip having a desired gauge.

10. The method of claim 9, wherein cold rolling the hot rolled band to a clad strip having a desired gauge comprises two or more steps of cold rolling, wherein the cold rolled strip is annealed intermediate successive steps of cold rolling.

11. The method of claim 9, wherein the cold rolled strip is bright annealed intermediate at least two successive steps of cold rolling.

12. The method of claim 1, wherein the clad product is a dual-clad product and the welded assembly comprises two cladding material plates, one of the cladding material plates being disposed on each of the opposed surfaces of the steel plate.

13. The method of claim 1, wherein the cladding material plate is nickel UNS N02201 nickel, the steel plate is T-316L stainless steel, and the alloy material is selected from T-316L stainless steel and T-304 stainless steel.

14. A method of making an article of manufacture, the method comprising:
making a clad product by the method of claim 1; and
fabricating the clad product into the article of manufacture.

15. The method of claim 14 wherein the article of manufacture is selected from the group consisting of a cistern, a chimney flue, a battery, tubing, a heat exchanger, a pipe, a tank, and an item of cookware.

16. A method for producing a clad stainless steel, the method comprising:
providing a welded assembly comprising
disposing an alloy cladding material plate on a stainless steel plate, wherein a peripheral edge of the cladding material plate does not at any point extend to a peripheral edge of the stainless steel plate and thereby provides a margin on the stainless steel plate,
disposing at least one framing element within the margin and directly against the entire peripheral edge of the cladding material plate, wherein each framing element extends to the peripheral edge of the stainless steel plate and is an alloy having greater hot strength than the cladding material plate, and wherein a surface of the cladding material plate is substantially coplanar with a surface of each framing element;
welding the cladding material plate to each framing element, and
welding each framing element to the stainless steel plate; and
hot rolling the welded assembly to provide a hot rolled band, wherein the at least one framing element inhibits the cladding material plate from spreading beyond the peripheral edge of the stainless steel plate during the hot rolling.

17. The method of claim 16, wherein the stainless steel plate is selected from T-316L stainless steel, T-316 stainless steel, T-304L stainless steel, and T-304 stainless steel.

18. The method of claim 16, wherein the cladding material is selected from the group consisting of nickel, a nickel alloy, copper, a copper alloy, and a stainless steel.

19. The method of claim 16, wherein the at least one framing element is selected from the group consisting of stainless steel, a nickel-base superalloy, and a cobalt-base superalloy.

20. The method of claim 16, wherein the cladding material plate is nickel, the stainless steel plate is T-316L stainless steel, and the one or more framing elements are one of T-316L stainless steel and T-304 stainless steel.

21. The method of claim 16, wherein the clad product is a dual clad product, and providing the welded assembly comprises:
disposing an alloy cladding material plate on each of the opposed surfaces of a stainless steel plate, wherein a peripheral edge of each of the cladding material plates does not at any point extend to a peripheral edge of the stainless steel plate and thereby provides a margin on each of the opposed surfaces of the stainless steel plate;
disposing at least one framing element in the margin and directly against the entire peripheral edge of each cladding material plate, wherein each framing element extends to a peripheral edge of the stainless steel plate and comprises an alloy having hot strength greater than the cladding material plate; and
welding each cladding material plate and the stainless steel plate to each framing element.

22. The method of claim 16 further comprising:
optionally annealing the hot rolled band; and
cold rolling the hot rolled band to a clad strip having a desired gauge.

23. A method of making an article of manufacture, the method comprising:

making a clad product by the method of claim 16; and
fabricating the clad product into the article of manufacture.

24. The method of claim 23 wherein the article of manufacture is selected from the group consisting of a cistern, a chimney flue, a battery, tubing, a heat exchanger, a pipe, a tank, and an item of cookware.

25. A welded assembly useful in the production of clad products, the welded assembly comprising an alloy cladding material plate disposed on a steel plate, wherein in the welded assembly a peripheral edge of the cladding material plate does not at any point extend to a peripheral edge of the steel plate and thereby provides a margin between the peripheral edges, wherein at least one framing element is within the margin and directly against the entire peripheral edge of the cladding material plate and each framing element extends to the peripheral edge of the steel plate, wherein a surface of the cladding material plate is substantially coplanar with a surface of each framing element, and wherein each framing element has hot strength greater than the cladding material plate and inhibits the cladding material plate from spreading beyond the edge of the steel plate during a hot rolling process.

26. A welded assembly useful for producing a clad product, the welded assembly comprising:

a stainless steel plate having a peripheral edge;
an alloy cladding material plate having a peripheral edge,
  wherein the cladding material plate is disposed on a surface of the stainless steel plate, and
  wherein the peripheral edge of the alloy cladding material plate does not at any point extend to the peripheral edge of the stainless steel plate and thereby provides a margin on the stainless steel plate between the peripheral edges; and
a framing element within the margin and directly against the peripheral edge of the alloy cladding material plate,
  wherein the framing element extends to the peripheral edge of the stainless steel plate,
  wherein a surface of the alloy cladding material plate is substantially coplanar with a surface of the framing element,
  wherein the framing element is an alloy having hot strength greater than the cladding material plate and inhibits the cladding material plate from spreading beyond the edge of the steel plate during a hot rolling process, and
  wherein the framing element is welded to the stainless steel plate and the cladding material plate.

* * * * *